Aug. 18, 1942.  C. W. GADD  2,293,289
STRAIN GAUGE
Filed May 8, 1941  2 Sheets-Sheet 1

Inventor
Charles W. Gadd
By Chalmers, Spencer & Flint
Attorneys

Aug. 18, 1942.          C. W. GADD          2,293,289
STRAIN GAUGE
Filed May 8, 1941          2 Sheets-Sheet 2

Inventor
Charles W. Gadd
By Blackmore, Spencer & Flint
Attorneys

Patented Aug. 18, 1942

2,293,289

UNITED STATES PATENT OFFICE 2,293,289

STRAIN GAUGE

Charles W. Gadd, Detroit, Mich., assignor to General Motors Corporation, Detroit, Mich., a corporation of Delaware Application May 8, 1941, Serial No. 392,509

6 Claims. (Cl. 33—148)

My invention relates to extensometers or strain gauges of the type used in measuring strains of a small order of magnitude.

In recent years designers and engineers have realized that mathematical computations are not always accurate to determine stresses at various points of a loaded member, especially where the loaded member is irregular in shape or where it is designed with sharp corners or fillets. It is now realized that such corners and fillets result in concentrations of stresses which cannot be determined by methods of mathematical computation known or used at the present time.

The principal object of my invention is to provide a small size strain gauge or extensometer of short gauge length which may be used to determine the strain at various points of a loaded member. The stress may then be determined from the measured strain by known relationships, which depend upon the material tested and the character of the stress involved.

More specifically, the principal object of my invention is to provide an extensometer having a fixed and a movable grating or screen located between a source of light and a light sensitive cell in such a manner that movement of one of two gauge points relatively to the other actuates the movable grating so as to vary the amount of light transmitted to the cell. The cell is connected to a highly sensitive galvanometer which is calibrated to indicate cell output in microamperes, which in turn may be plotted against strain.

Figure 1 of the drawings shows a strain gauge embodying my invention in position on a test piece to which known loads may be applied for purposes of calibration.

Figure 7:
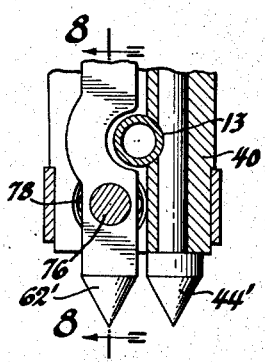
Figure 8:
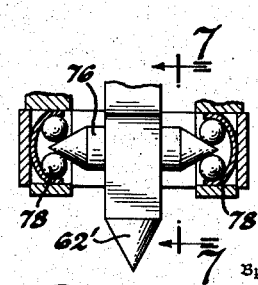

Figures 7 and 8 are detail views illustrating an alternative pivot for the movable gauge point. Figure 7 is a view in section substantially on line 7—7 of Figure 8, and Figure 8 is a view in section substantially on line 8—8 of Figure 7.

Figure 9:
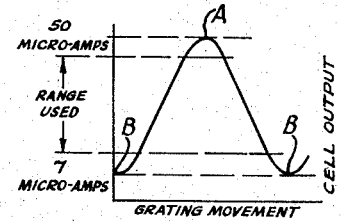

Figure 9 is a diagram showing the relation between cell output and grating movement.

Figure 2:
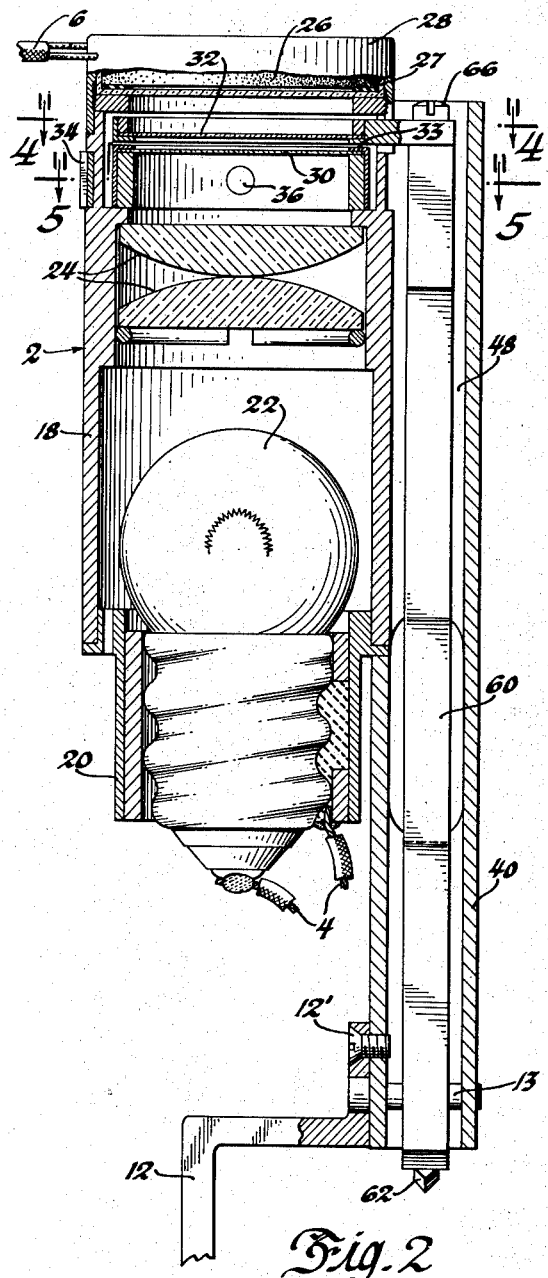
Figure 2 is a view with parts broken away and in section showing details of a strain gauge built according to my invention.
Figure 3:
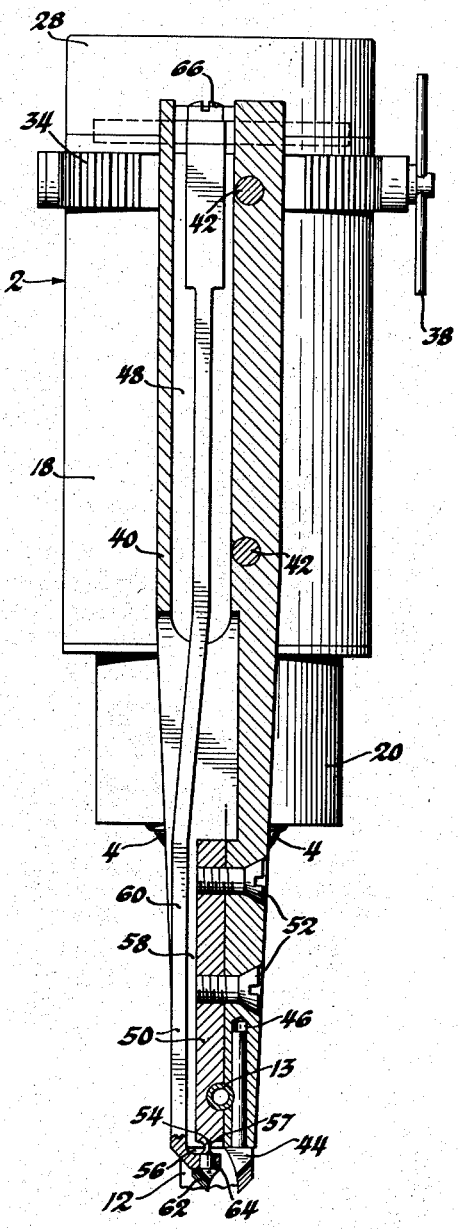
Figure 3 is a view at right angles to Figure 2 with parts broken away and in section, illustrating details of my invention not shown in Figure 2.

Referring to the drawings, 2 indicates generally a strain gauge built according to my invention. Conductors 4 supply current from any suitable source to the light bulb situated in the barrel of the gauge. Conductors 6 connect the light sensitive cell with a highly sensitive galvanometer having a needle or pointer 8 and a scale 8', which may be calibrated in microamperes. My gauge is held in engagement with a test bar 10 by any suitable means such as a C clamp 12. As best seen in Figures 2, 3 and 7, clamp 12 carries a pin 13 which serves as a pivot for the gauge. In order to equalize the pressure on the two points 44 and 62, pivot 13 is preferably disposed midway between these points. To assist in holding the gauge so that its axis remains normal to the surface of the work piece, clamp 12 may be provided with a screw 12'. Test bar 10 is mounted in a machine 14 provided with a micrometer screw and spring assembly 16 which permits the application of predetermined loads to the bar 10.

As shown in detail in Figures 2 to 6, my strain gauge comprises a barrel or frame 18 in which is mounted a socket 20 holding a light bulb 22. The rays from bulb 22 pass through a pair of collimating lenses 24 which transmit the rays in a parallel condition to a light sensitive cell 26 secured within a cap member 28. As will be understood by those skilled in the art, any of a number of light sensitive cells might be used; I prefer, however, to use a photoelectric cell of the barrier layer type. I may provide a protective cap 27 of any adaptable light transmitting material, such as one made of a synthetic resin.

Interposed between the collimating lenses and the photoelectric cell are two screens or gratings 30 and 32. I have made satisfactory gratings by photographing a screen having alternating white and black lines. The resulting photographic emulsion provides a screen which has parallel dark lines 31a spaced by transparent lines 31b c the same width. The emulsion may be carried on any suitable light pervious backing material, such as glass. However, I prefer to use ordinary Celluloid because it is not so heavy as glass.

For gauges having gauge lengths of ⅛ inch and 1/16 inch, I have found gratings satisfactory which have 80 and 160 lines per inch, respectively. Grating 30 is normally stationary relatively to casing or barrel 18 but may be adjusted rotatively by means of a knurled band 34; grating 30 may be given a translatory motion relatively to casing 18 by means of screw 36, which may be turned by handle 38. At the opposite end of a diameter through screw 36 is a pin 37 (Fig. 5) which, with the help of screw 36, supports the holder or frame 33 of screen 30. Screw 36 and pin 37 are supported by knurled band 34. Enlarged openings 35 in casing 18 make limited angular adjustment of screen 30 possible. The lateral or transverse adjustment thus provided is in a direction substantially perpendicular to the direction of lines 31a and 31b.

It is thus evident that I have provided both an angular adjustment and a lateral adjustment for screen or grating 30 in relation to casing 18. The angular adjustment makes possible parallel alignment of the lines of screen 30 with the lines of screen 32. This alignment is effected with cap 28 removed. With light 22 on, dark bands will appear on screen 32 if the lines of the two screens are not parallel. By means of the knurled band 34, screen 30 can be adjusted angularly until the dark bands have disappeared. The two screens are then properly aligned insofar as angular relationship is concerned. The purpose of lateral adjustment by means of screw 36 will be explained in a subsequent paragraph.

A leg member 40 is secured to casing 18 by means of screws 42. In the lower end of leg 40 a hardened steel gauge point 44 is inserted in a hole 46 drilled in leg 40. Gauge point 44 may be made integral with leg 40, if desired, but I prefer to use an insert of any of a number of wear resistant alloys. Leg 40 is itself a hollow member, made so by milling to provide the substantially rectangular channel 48.

A gauge point supporting member 50 is secured to the lower end of leg 40 by means of screws 52. Near the lower end of member 50 a spring pivot 54 is provided. This pivot may be formed by drilling holes 56 and 57 near the lower end of member 50, and cutting a slot 58 by sawing from the upper end of member 50 down to hole 56. The metal strip remaining forms an elongated arm or lever 60 which is secured to member 50 by the spring pivot 54. A gauge point may be made at the lower end of lever 60 and integral therewith. However, I prefer to insert a gauge point 62 of any suitable wear resistant material in a hole 64 drilled in member 60 for this purpose. Lever arm 60 extends through channel 48 in leg 40 to a point near the upper end of casing 18.

Figure 4:
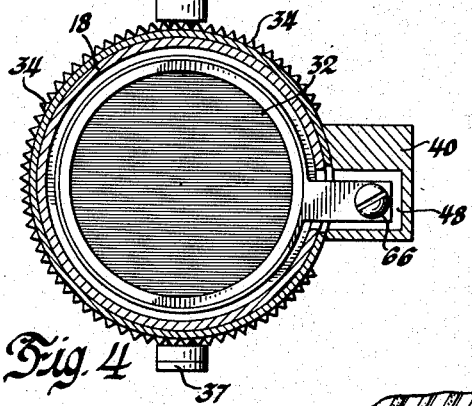
Figure 4 is a view in section substantially on line 4—4 of Figure 2.
Figure 5:
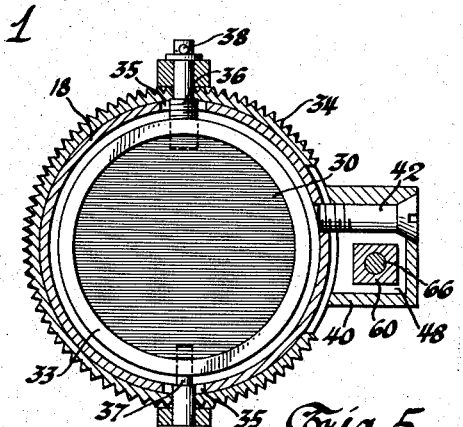
Figure 5 is a view in section substantially on line 5—5 of Figure 2.
Figure 6:
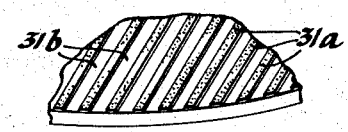
Figure 6 is a detail view of a portion of one of the gratings.

The frame of movable grating 32 may be secured to the upper end of lever arm 60 by a screw 66. As seen in Figure 4, the motion of grating 32 is up and down, substantially perpendicular to the ruled lines. As best seen in Figure 3, this movement of grating or screen 32 is in response to movement of gauge point 62 about its pivot 54. The extremely slight movement of gauge point 62 is multiplied mechanically by the relatively large ratio of lever arm 60 to the distance between spring pivot 54 and the tip of gauge point 62. A further magnification is effected by means of the above described optical system comprising the light source, the light sensitive cell and the two screens. I prefer also to include the above described collimating lenses 24 to transmit parallel light rays to the light-sensitive cell 26.

Figure 1:
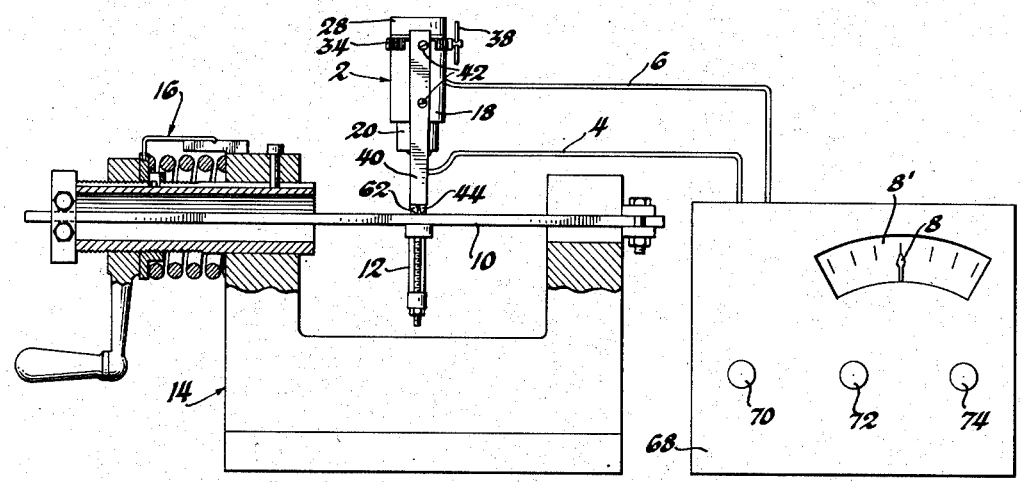

As will be readily understood by those skilled in the art, as screen 32 moves transversely in relation to screen 30 and in a direction perpendicular to the ruled lines, the light transmitted to cell 26 varies between maximum and minimum values. This varying light on cell 26 causes a deflection of the galvanometer needle 8 (Figure 1). Figure 9 shows the form of curve which illustrates graphically the relation between grating movement plotted horizontally and cell output plotted vertically. The maximum and minimum points on this curve are shown as A and B respectively in Figure 9. Somewhere between these points, the cell output and grating movement have a straight line relationship. It is over some part of this straight line portion of the curve that the instrument is intended to be used.

The power source for the electric light bulb 22 may, if desired, be a dry cell or a plurality of dry cells. This power source may be housed in a casing or box 68 (Figure 1). I find it preferable, however, to use a standard A. C. source with a suitable voltage reduction transformer, which may be switched on and off by a control knob 70. Some sort of voltage regulator may also be found to be necessary.

Knobs 72 and 74 may be used to control coarse and fine rheostats respectively. These rheostats are used to adjust the meter deflection to full scale value when the cell output is a maximum. This operation will be explained in a subsequent paragraph.

For the sake of convenience it may be found desirable to put this equipment into two or more carrying cases or boxes. I have illustrated all this equipment as being in one case as shown in Figure 1.

Although I prefer to use a spring pivot for movable gage point 62, such as shown in Figure 3, it may be mentioned that my gauge is not restricted to this type. I have illustrated in Figures 7 and 8 a ball bearing pivot which I have used and have found satisfactory. Illustrated in these figures is a wear resistant gauge point 44', inserted in leg 40. Movable gauge point 62' carries a short shaft 76, the conical ends of which are pivotally mounted in ball bearings 78.

I have found it desirable to make the various parts of my gauge of a light weight material, wherever possible, and to keep the dimensions of all parts as small as possible. I have found that the pressure necessary on the points to keep the gauge in position on the loaded member being tested is so great in the case of a heavy gauge as to cause undue wear of the gauge points. A small gauge has the advantage of light weight, and the further advantage of being usable in places affording very little space. The gauges I have made and used successfully have all measured approximately two and a quarter inches long from the end cap 28 to the gauge points.

The difficulty due to excess weight arises, of course, when the gauge is in some position other than that shown in Figure 1. For example, where the gauge is applied to a vertical surface, the long axis of the gauge is horizontal. A heavy gauge in this position will have a turning moment about the gauge points of considerable value. To avoid slipping of the points and consequent inaccuracies, it would be necessary to apply such force on the gauge as would quickly result in wear of the delicate moving parts, and would impair the accuracy and efficiency of the gauge.

The use and operation of my strain gauge are as follows: A gauge having the desired gauge length is selected and its end cap 28 containing the light sensitive cell is removed. With light 22 burning, the lines on screen 30 are brought into alignment with those of screen 32 by adjustment of knurled band 34 until no dark bands appear transversely of the screen 32 as viewed from the open end. End cap 28 is then replaced and the gauge is mounted in position on a work piece such as bar 10 of Figure 1, by any suitable holding means such as the illustrated C clamp 12. The clamp need be screwed up only tight enough to insure that there will be no slipping of the gauge points. With a gauge weighing one-half ounce, I have found a force of one pound satisfactory, applied at the gauge pivot through pin 13. Handle 38 of screw 36 is then rotated until the meter gives a maximum reading. The resistance of the circuit is then varied by means of knobs 72 and 74 until this maximum is 50 microamperes. Screw 38 is again turned, moving grating or screen 30 transversely until some low point on the output curve is reached. It is desirable to keep the operating range of the galvanometer on this straight line portion of the output curve, because in this range any given unit of pointer deflection on the galvanometer represents an unvarying amount of strain in the loaded member.

After handle 38 has been turned to bring the meter reading down to a suitable starting point, a load is put on the test member; if the gauge and meter are being calibrated this load will have a predetermined value and will permit calculation of the actual displacement or change in distance between the two gauge points in relation to galvanometer pointer deflection. The device is then ready for use on a structure to be tested.

It will be evident to those skilled in the art that I have provided here a device for measuring strain in loaded members which is readily portable and easily applied to loaded members of varying shapes. It will also appear that modifications and changes may be made in the apparatus illustrated without departing from the spirit of my invention.

I claim:

1. In a strain gauge, a tubular frame, an electric light source in the frame, a photoelectric cell in position to receive light from said source, a lens system for directing light of substantially uniform cross section from the source to the cell, a grating fixed between the lens system and the cell, a grating movably mounted adjacent the fixed grating, a hollow leg secured to the frame, a gauge point fixed to said leg, a gauge point pivotally mounted adjacent the fixed gauge point, and a lever arm in said hollow leg connecting the pivoted gauge point to the movable grating whereby displacement of the pivoted gauge point relatively to the fixed gauge point causes a variation in the intensity of light admitted to the photoelectric cell.

2. In a strain measuring device, a tubular casing, an electric light source in the casing, a photoelectric cell in light receiving position in the casing, a grating fixed between the light source and the cell, a grating movably mounted adjacent the fixed grating, a hollow leg secured to the frame, a gauge point fixed to said leg, a gauge point pivotally mounted adjacent the fixed gauge point, a lever arm in said hollow leg connecting the pivoted gauge point to the movable grating, and a galvanometer electrically connected to the photoelectric cell, whereby displacement of the pivoted gauge point relatively to the fixed gauge point causes a deflection of the galvanometer indicating means.

3. In a strain gauge, a frame, a gauge point fixed to the frame, a supporting member fixed to the frame, a gauge point pivotally secured to the supporting member by a narrow neck of metal integral with the supporting member and the gauge point, and means including a single lever arm positively linking the pivotally mounted gauge point with a light screen for varying the amount of current transmitted to an electrically responsive indicating means.

4. In a strain gauge, a frame, a gauge point fixed to the frame, a supporting member secured to the frame, a gauge point pivotally mounted on the supporting member by a resilient bridging member integral with the supporting member and the gauge point, a single lever arm connected to the pivotally mounted gauge point, and means including a screen positively linked with the lever arm whereby displacement of the pivoted gauge point in relation to the fixed gauge point affects a visual indicator.

5. In a strain gauge, a tubular frame, a grating normally fixed in said frame, screw means mounted in the frame and engaging the normally fixed grating to move it transversely of the frame, means including a knurled band mounted on said tubular frame for adjusting the normally fixed grating angularly with respect to the frame, a second grating mounted adjacent the first and movable relatively thereto, and means for moving said second grating in response to the strain being measured.

6. In a strain gauge, a tubular frame, a knurled band mounted on the frame for rotary movement relatively to the frame, a support pin mounted on the knurled band, a support screw mounted on the knurled band diametrically opposite the support pin, a grating movably supported by the screw and pin, and a second grating movably mounted in the frame in response to the strain being measured whereby light transmitted through the gratings may be varied from a minimum to a maximum by movement of the second grating relatively to the first.

CHARLES W. GADD.